United States Patent
Lin et al.

(10) Patent No.: US 10,536,066 B2
(45) Date of Patent: Jan. 14, 2020

(54) PRESSED GENERATOR, REMOTE CONTROL SIGNAL TRANSMITTER, REMOTE CONTROL DEVICE AND SHOWER EQUIPPED WITH PRESSED GENERATOR

(71) Applicant: Fujian Xihe Sanitary Ware Technology Co., Ltd., Nan'An (CN)

(72) Inventors: Xiaofa Lin, Nan'An (CN); Xiaoshan Lin, Nan'An (CN); Caibo Gu, Nan'An (CN); Qiqiao Liu, Nan'An (CN); Xiaoqing Deng, Nan'An (CN)

(73) Assignee: Fujian Xihe Sanitary Ware Technology Co., Ltd., Fujian (CN)

( * ) Notice: Subject to any disclaimer, the term of this patent is extended or adjusted under 35 U.S.C. 154(b) by 93 days.

(21) Appl. No.: 15/944,870

(22) Filed: Apr. 4, 2018

(65) Prior Publication Data

US 2018/0294703 A1    Oct. 11, 2018

(30) Foreign Application Priority Data

Apr. 10, 2017   (CN) .......................... 2017 1 0229642
Apr. 10, 2017   (CN) ...................... 2017 2 0368167 U (51) Int. Cl.
| | | |
|---|---|---|
| *H02K 35/02* | (2006.01) | |
| *H02K 7/18* | (2006.01) | |
| *B05B 12/00* | (2018.01) | |
| *B05B 1/18* | (2006.01) | |
| *F16K 31/06* | (2006.01) | |
| *G08C 19/38* | (2006.01) | |

(52) U.S. Cl.
CPC ........... *H02K 35/02* (2013.01); *B05B 12/002* (2013.01); *H02K 7/1853* (2013.01); *H02K 7/1876* (2013.01); *B05B 1/18* (2013.01); *F16K 31/06* (2013.01); *G08C 19/38* (2013.01)

(58) Field of Classification Search
CPC ...................................................... A02K 35/02
USPC ............................................................. 4/601
See application file for complete search history.

(56) References Cited

U.S. PATENT DOCUMENTS 4,412,355 A    10/1983   Terbrack et al.

FOREIGN PATENT DOCUMENTS

| CN | 2860101   Y | 1/2007 |
|---|---|---|
| CN | 200950567 Y | 9/2007 |
| CN | 201393136 Y | 1/2010 |
| CN | 106877622 A | 6/2017 |
| CN | 206743084 U | 12/2017 |

*Primary Examiner* — Lori L Baker
(74) *Attorney, Agent, or Firm* — The Dobrusin Law Firm, PC (57) ABSTRACT

A pressed generator includes a generator body and a driving unit, wherein the driving unit includes a button and a transmission part, the transmission part being configured to convert a movement of pressing the button into a movement of cutting magnetic induction lines by a coil in the generator body. More power can be provided by this pressed generator.

19 Claims, 6 Drawing Sheets

PRESSED GENERATOR, REMOTE CONTROL SIGNAL TRANSMITTER, REMOTE CONTROL DEVICE AND SHOWER EQUIPPED WITH PRESSED GENERATOR

CROSS-REFERENCE TO RELATED APPLICATION

The present application is based upon and claims the benefit of priorities of Chinese Patent Application Nos. 201710229642.2 and 201720368167.2, filed on Apr. 10, 2017, the entire contents of which are incorporated herein by reference.

TECHNICAL FIELD

The present disclosure relates to the field of bathware, and more particularly, to a pressed generator, a remote control signal transmitter, a remote control device and a shower equipped with the generator.

BACKGROUND

Most of the existing remote controllers use primary batteries such as lithium batteries, dry batteries, etc. as power supplies. Such remote controllers may be not energy-saving and environmental friendly and meanwhile may make a great waste in term of energy. Besides, they may introduce a burden of purchasing and replacing batteries to users. Especially in the field of bathware, the using environment of the remote controller is relatively harsh; the corrosiveness by humid environment is particularly obvious to batteries and would reduce the lifetime of batteries. Thus, in the field of smart bathware, battery-free is now one of the most critical and the most important technical challenges to be solved.

SUMMARY

In one aspect, in general, the present disclosure describes a pressed generator comprising a generator body and a driving unit connected thereto, wherein the driving unit comprises a button and a transmission part cooperating with the button, and the transmission part is configured to convert a movement of pressing the button into a movement of cutting magnetic induction lines by a coil in the generator body.

In another aspect, the present disclosure describes a remote control signal transmitter comprising the above described pressed generator.

In yet another aspect, in general, the present disclosure describes a remote control device comprising the above described remote control signal transmitter and a remote control signal receiver.

In a further aspect, in general, the present disclosure describes a shower comprising an overhead showerhead and a hand-held showerhead, wherein the remote control device described above is mounted in the shower, with the remote control signal receiver mounted in the overhead showerhead and the remote control signal transmitter mounted in the hand-held showerhead.

BRIEF DESCRIPTION OF THE DRAWINGS

The drawings described herein are provided for further understanding on the present disclosure and constitute part of it. The exemplary embodiments and the description thereof are used to explain the present disclosure, but do not constitute any limit thereon. In the drawings.

DETAILED DESCRIPTION

In order to make the technical problem to be solved by the present disclosure, the technical solution and the advantageous effects clearer and more understandable, further descriptions will be provided on the present disclosure by taking reference to the drawings and embodiments. It should be understood that the specific embodiments described herein are merely for the purpose of explanation, without making any limit.

Referring to FIGS. 1 to 6, there is provided a pressed generator comprising a generator body and a driving unit connected thereto, wherein the driving unit comprises a button 3 and a transmission part 4 cooperating with the button 3, and the transmission part 4 converts a movement of pressing the button 3 into a movement of cutting magnetic induction lines by a coil in the generator body.

Embodiment 1

Figure 1:
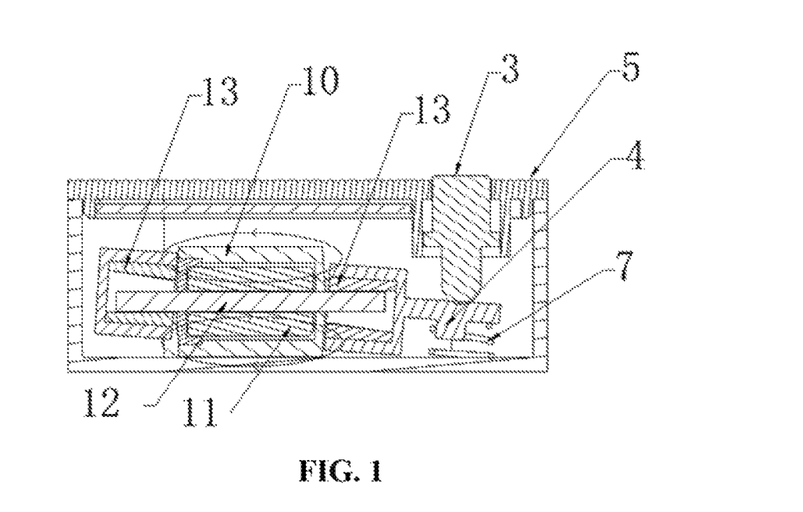
FIG. 1 is a cross-section structural diagram of an example pressed generator according to Embodiment 1 of the present disclosure.
Figure 2:
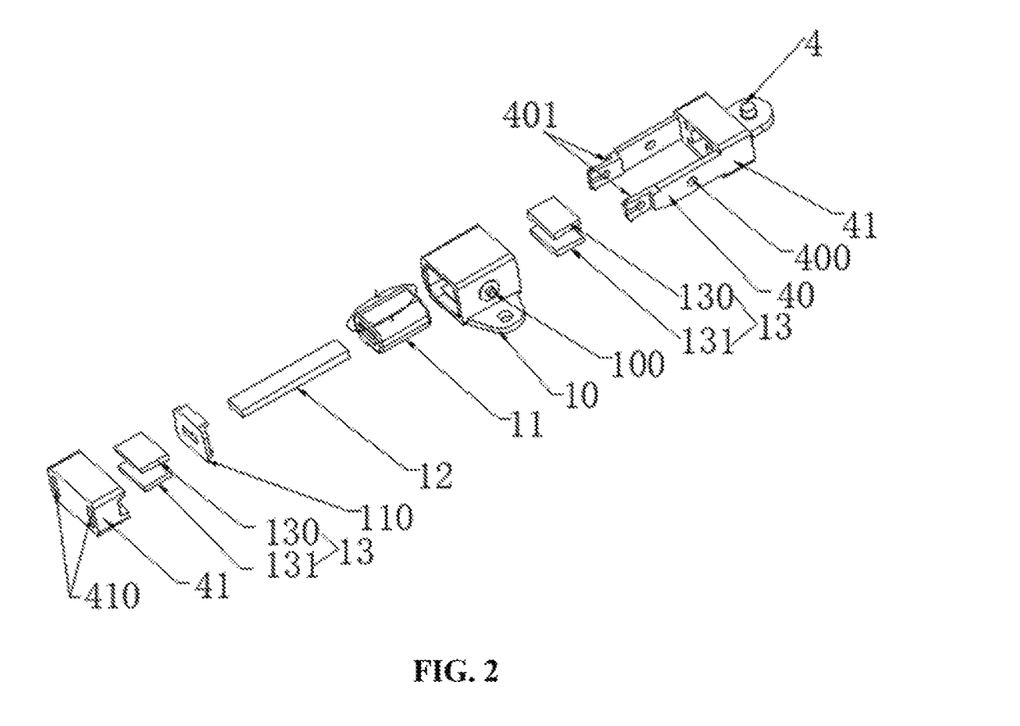
FIG. 2 is an exploded structural diagram of an example pressed generator according to Embodiment 1 of the present disclosure.

Referring to FIGS. 1 and 2, the generator body comprises a fixing frame 10, a coil 11, a magnetic conducting rod 12 and permanent magnets 13. The coil 11 is fixed in the fixing frame 10; the magnetic conducting rod 12 passes through the coil 11; the permanent magnets 13 include two sets of permanent magnets 13 which are separately provided at both ends of the magnetic conducting rod 12, each set of permanent magnets comprises an upper magnetic piece 130 and a lower magnetic piece 131 that are provided in parallel with each other, and the magnetic conducting rod 12 extends between the upper magnet pieces 130 and the lower magnet pieces 131.

The transmission part 4 comprises swing arms 40 and permanent magnet mounting frames 41, wherein the permanent magnet mounting frames 41 include two permanent magnet mounting frames 41 which are connected via the swing arms 40. The permanent magnets 13 are fixed in the permanent magnet mounting frames 41, and the button 3 is positioned at one end of one of the permanent magnet mounting frames 41. Shaft holes 400 are provided in the middle of the swing arms 40, protruding shafts 100 are provided on both sides of the fixing frame 10, the protruding shafts 100 are inserted into the shaft holes 400 to form rotating shafts, and the swing arms 40 swing around the rotating shafts, to drive the permanent magnets 13 to move up and down alternately.

In the example shown in FIG. 2, the swing arms 40 form integratedly with one permanent magnet mounting frame 41, inserting pieces 401 on one ends of the swing arms 40 can be inserted into the inserted holes 410 on the other permanent magnet mounting frame 41. It should be understood that this does not possess a limit to the present disclosure; for example, the swing arms 40 and the two permanent magnet mounting frames 41 may be formed separately and then assembled together.

The pressed generator further comprises a housing 5, wherein the generator body and the driving unit are mounted into the housing 5 after being assembled, the coil 11 and the magnetic conducting rod 12 are fixed in the housing 5 by the fixing frame 10. A spring 7 is provided beneath the button 3, more particularly, between the lower side of one permanent magnet mounting frame 41 and the housing 5. When the button 3 is not pressed, the top of the button 3 penetrates out of the housing 5.

FIG. 2 has also shown an end cap 110 for closing one end of the fixing frame 10. It should be understood that, the button 3 may function as a key or a part of a key. Or the button 3 may be positioned beneath the key.

In use, the button 3 can be pressed to move downward and pushed by the spring 7 via the permanent magnet mounting frame 41 to move upward, thereby driving the two sets of permanent magnets 13 to move up and down alternately, so that the polarities of the magnetic conducting rod 12 change instantaneously, achieving the purpose of cutting the magnetic induction lines by the magnetic induction coil 11 for the power generation.

The pressed generator according to Embodiment 1 employs a seesaw structure. In use, the button can be pressed to move downward and by the spring to move upward, thereby driving the permanent magnets to move up and down alternately, so that the polarities of the magnetic conducting rod change instantaneously, then achieving the purpose of cutting the magnetic induction lines by the magnetic induction coil for the power generation. With this structure, the key requires shorter stroke distance for generating sufficient power, and the structure is compact, easy to operate, and provides good use-experience in switching.

Embodiment 2

Figure 3:
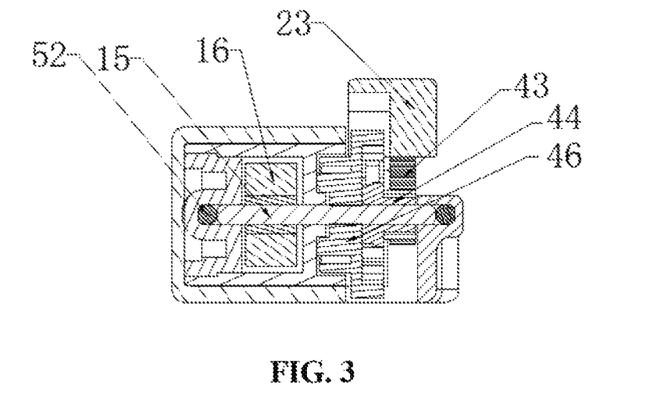
FIG. 3 is a cross-section structural diagram of an example pressed generator according to Embodiment 2 of the present disclosure.
Figure 4:
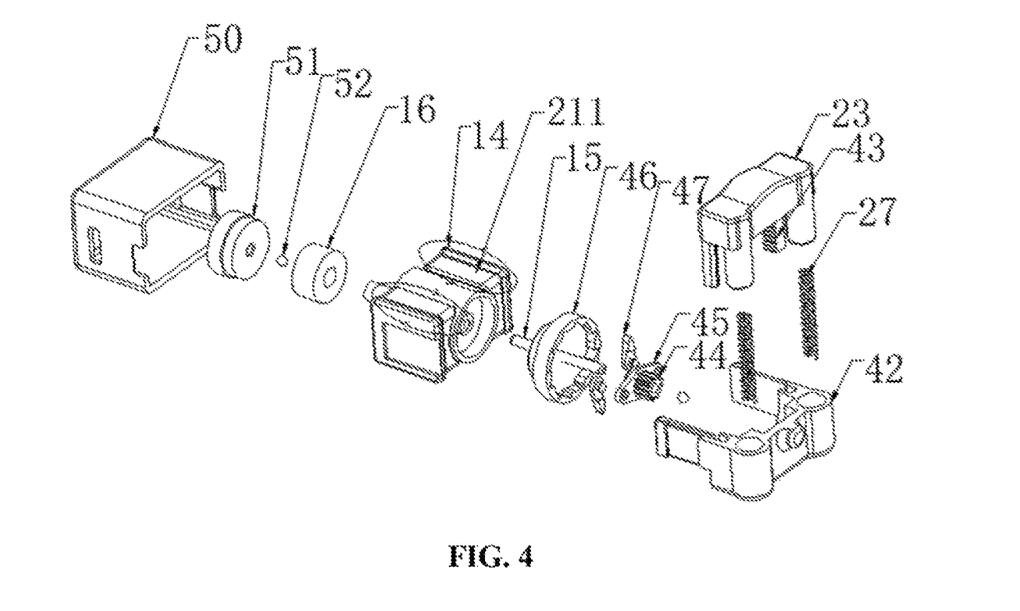
FIG. 4 is an exploded structural diagram of an example pressed generator according to Embodiment 2 of the present disclosure.

Referring to FIGS. 3 and 4, the generator body comprises a coil winding frame 14, a coil 211, a rotating shaft 15 and a magnetic ring 16. The coil 211 is installed in the coil winding frame 14; the magnetic ring 16 is installed at one end of and within the coil 211, and is provided coaxially with the coil 211; the rotating shaft 15 passes through the coil 211 and the magnetic ring 16 at the center, and the magnetic ring 16 is connected to the rotating shaft 15 fixedly so that the magnetic ring 16 rotates with the rotating shaft 15 within the coil 211.

The transmission part according to the present embodiment comprises a movement converting mechanism configured to convert straight movements of the button 23 into rotations of a magnetic component in the generator body. The movement converting mechanism may comprise a rack 43 and an external gear 44 as described below.

The transmission part according to the present embodiment further comprises springs 27 pressing the button 23 and a mono-directional clutch, the pressed generator at least generates power when the button 23 is bounced up by the springs 27. The mono-directional clutch may comprise a ratchet wheel 46 and pawls 47 as described below.

More particularly, the transmission part comprises a button base 42, springs 27, the rack 43, the external gear 44, an external gear frame 45, the ratchet wheel 46 and the pawls 47. The button 23 is installed in the button base 42, and the springs 27 are installed between the button base 42 and the button 23; the rack 43 extends from the bottom of the button 23 in an opposite direction to the button 3, and the teeth of the rack 43 engage with the teeth of the external gear 44; the external gear 44 is fixed to the middle of the external gear frame 45, the pawls 47 are connected on the opposite edges of the external gear frame 45 in a movable manner, so that the pawls 47 can be rotated with respect to the external gear frame 45 by a predetermined angle; the pawls 47 and the external gear frame 45 are mounted into the ratchet wheel 46 together, and the pawls 47 engage with the internal teeth of the ratchet wheel 46. The ratchet wheel 46 is located at the other end of the coil 211, the rotating shaft 15 passes through the ratchet wheel 46 and the external gear frame 45 at the center, and the rotating shaft 15 is fixedly connected to the ratchet wheel 46; the rotating shaft 15 is rotatable with respect to the external gear frame 45.

The pressed generator further comprises a base 50, a coil bottom cap 51 and balls 52. The coil bottom cap 51 is arranged to cover one end of the coil 211, and the ball 52 is installed between the coil bottom cap 51 and an end of the rotating shaft 15; and the generator body and the transmission part are mounted into the base 50 after being assembled.

In use, when the button 23 is pressed down, the rack 43 will move downward with the button 3, and when the button 23 is released, the rack 43 moves upward with the button 23 under the action of the springs 27. During the entire movement, the rack 43 drives the external gear 44 to rotate, and the external gear 44 drives the external gear frame 45 to rotate. When the external gear frame 45 rotates in clockwise, the pawls 47 will slip inside the ratchet wheel 46, and at that time, the ratchet wheel 46 and the rotating shaft 15 do not move, and no power is generated; and when the external gear frame 45 rotates in counterclockwise (e.g. when the button 23 is bounced up), the pawls 47 will be stuck inside the ratchet wheel 46, and the rotating shaft 15 rotates with the ratchet wheel 46, thereby driving the magnetic ring 16 to rotate in the coil 211, so as to achieve the purpose of cutting the magnetic induction lines by the magnetic induction coil 211 for the power generation. During the entire rotation of the rotating shaft 15, the ball 52 rotates at the bottom of the rotating shaft 15 with it, reducing the friction between the rotating shaft 15 and the base 50 (the coil bottom cap 51), increasing the rotating speed of the magnetic ring 16, thereby improving the efficiency of cutting the magnetic induction lines and the efficiency of the power generation by the generator.

The pressed generator according to Embodiment 2 employs a structure of cutting magnetic induction lines in rotation, which has a higher capacity of power generation than the existing pressed generators, satisfying the user's demand and being easy to operate.

Embodiment 3

Figure 5:
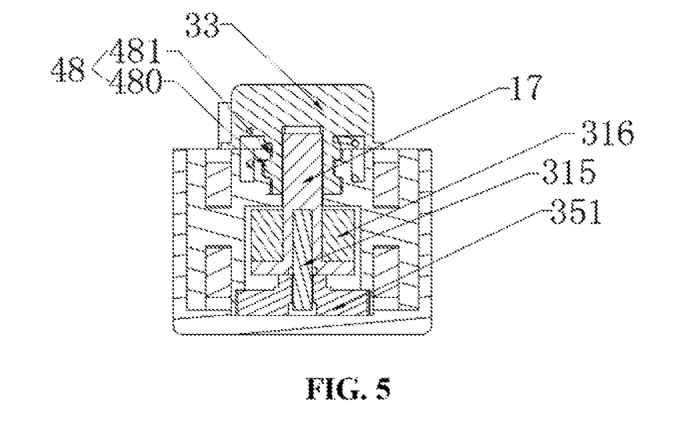
FIG. 5 is a cross-section structural diagram of an example pressed generator according to Embodiment 3 of the present disclosure.
Figure 6:
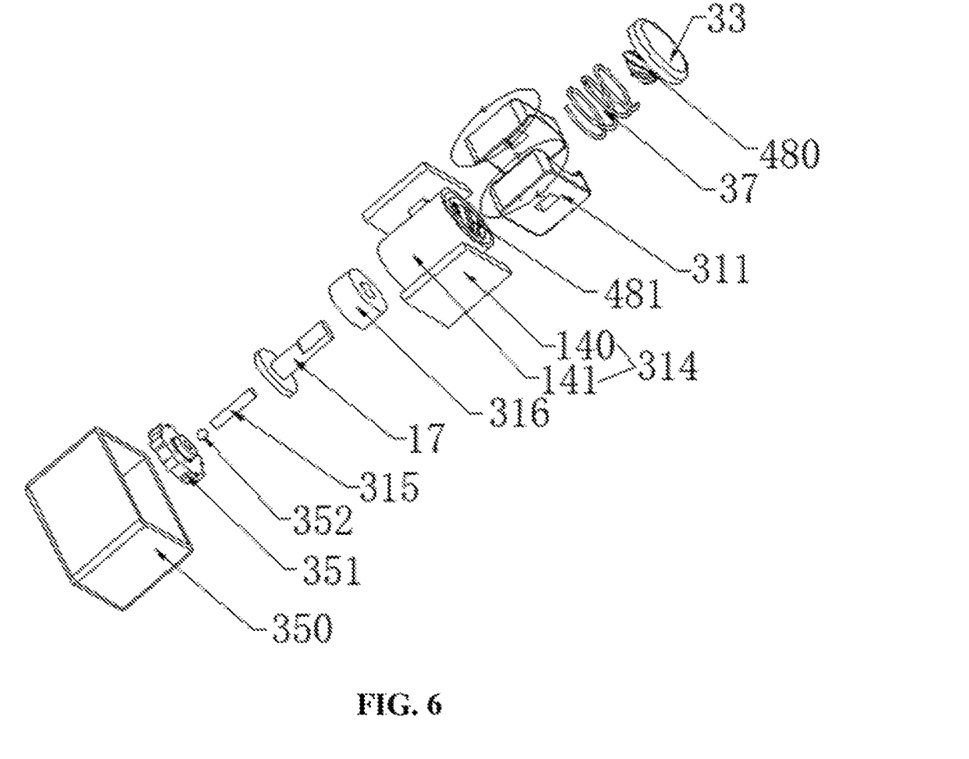
FIG. 6 is an exploded structural diagram of an example pressed generator according to Embodiment 3 of the present disclosure.

Referring to FIGS. 5 and 6, the generator body comprises the coil 311, the coil winding frame 314, the magnetic ring (magnetic component) 316, a magnetic ring inner frame 17, the rotating shaft 315 and the coil bottom cap 351. The coil winding frame 314 comprises outer frames 140 and an inner frame 141, and the outer frames 140 are provided on the both sides of the outer wall of the inner frame 141 and connected to the inner frame 141; the coil 311 is fixed between the outer frames 140 and the inner frame 141. The magnetic ring 316 is sheathed fixedly over the magnetic ring inner frame 17, and is mounted into the inner frame 141 together with the magnetic ring inner frame 17, the top of the magnetic ring inner frame 17 penetrates out of the top of the inner frame 141. One end of the rotating shaft 315 is inserted into the bottom of the magnetic ring inner frame 17 and the other end of the rotating shaft 315 is connected to the coil bottom cap 351 in a rotatable manner.

The transmission part comprises a threaded transmission assembly 48 and a spring 37, wherein the threaded transmission assembly 48 includes an externally threaded rod (a first threaded component) 480 extending downward from the bottom of the button 33, and an internally threaded wall 481 arranged on the inner wall of the inner frame 141, the middle of the externally threaded rod 480 has a hollow structure, and the top of the magnetic ring inner frame 17 is capable of being inserted into the hollow structure and connected to the externally threaded rod 480 in a non-relatively-rotatable manner.

The pressed generator further comprises the ball 352 and the base 350, wherein the ball 352 is mounted between the rotating shaft 315 and the coil bottom cap 351; and the generator body and the transmission part are mounted into the base 350 after being assembled.

In use, when the button 33 is pressed down, the externally threaded rod 480 moves downward along the internally threaded wall 481 and meanwhile rotates, driving the magnetic ring inner frame 17 to rotate with it and further driving the magnetic ring 316 to rotates in the coil 311; when the button 33 is released, the button 33 is restored to the previous position under the action of the spring 37, the externally threaded rod 480 moves upward along the internally threaded wall 481 and meanwhile rotates in an opposite direction, driving the magnetic ring inner frame 17 to rotate in an opposite direction and further driving the magnetic ring 316 to rotate in the coil 311, so as to achieve the purpose of cutting the magnetic induction lines by the magnetic induction coil 311 for the power generation. During the entire rotation of the rotating shaft 315, the ball 352 rotates at the bottom of the rotating shaft 315 with it, reducing the friction between the rotating shaft 315 and the base 350 (the coil bottom cap 351), increasing the rotating speed of the magnetic ring 316, thereby improving the efficiency of cutting the magnetic induction lines and the efficiency of the power generation by the generator.

Preferably, in the present embodiment, when the button 33 is not pressed, the button 33 or the externally threaded rod 480 is separated from the magnetic ring inner frame 17. After the button 33 has been pressed, when the button 33 is released and bounced up by the spring 37, the button 33 drives the magnetic ring inner frame 17 to rotate and then separates from the magnetic ring inner frame 17. After the separation, the magnetic ring inner frame 17 remains rotating under inertia. As such, the duration and amount of power generation is improved.

The pressed generator according to Embodiments 2 and 3 employ a structure of cutting magnetic induction lines in rotation, which has a higher capacity of power generation than the existing pressed generators, satisfying the user's demand and being easy to operate.

Embodiment 4

Figure 7:
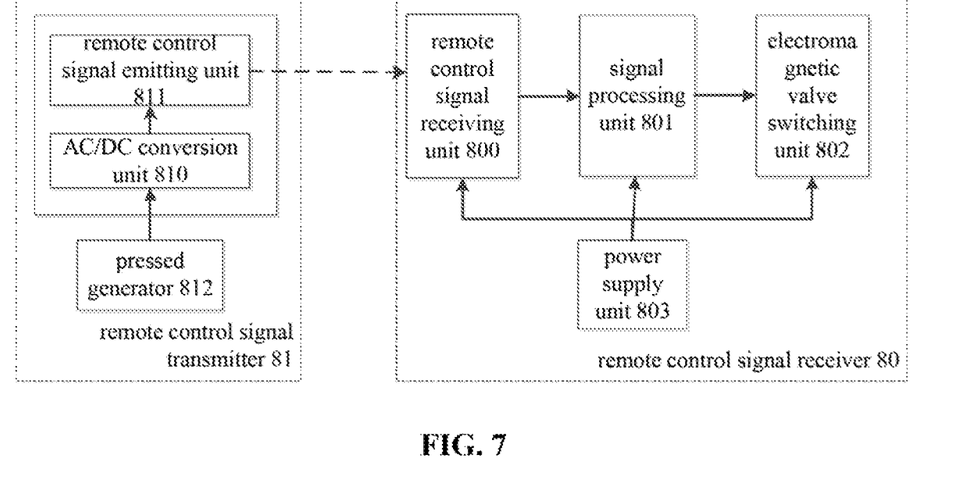
FIG. 7 is a schematic structural block diagram of an example remote control device according to the present disclosure.
Figure 8:
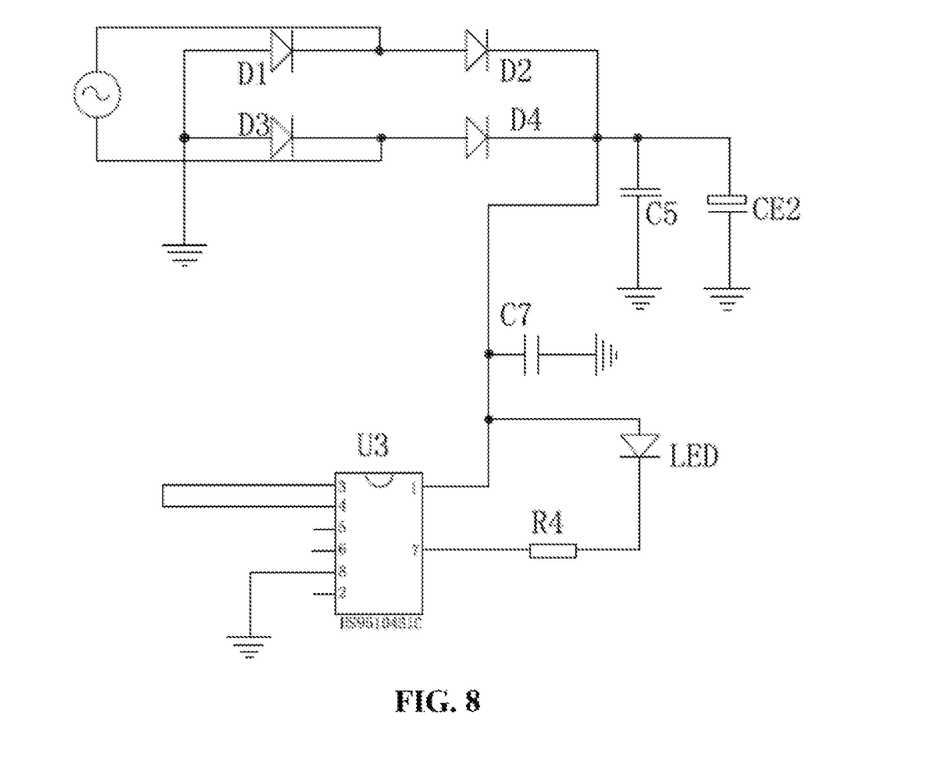
FIG. 8 is a circuit diagram of one specific example of the remote control signal transmitter according to the present disclosure.
Figure 9:
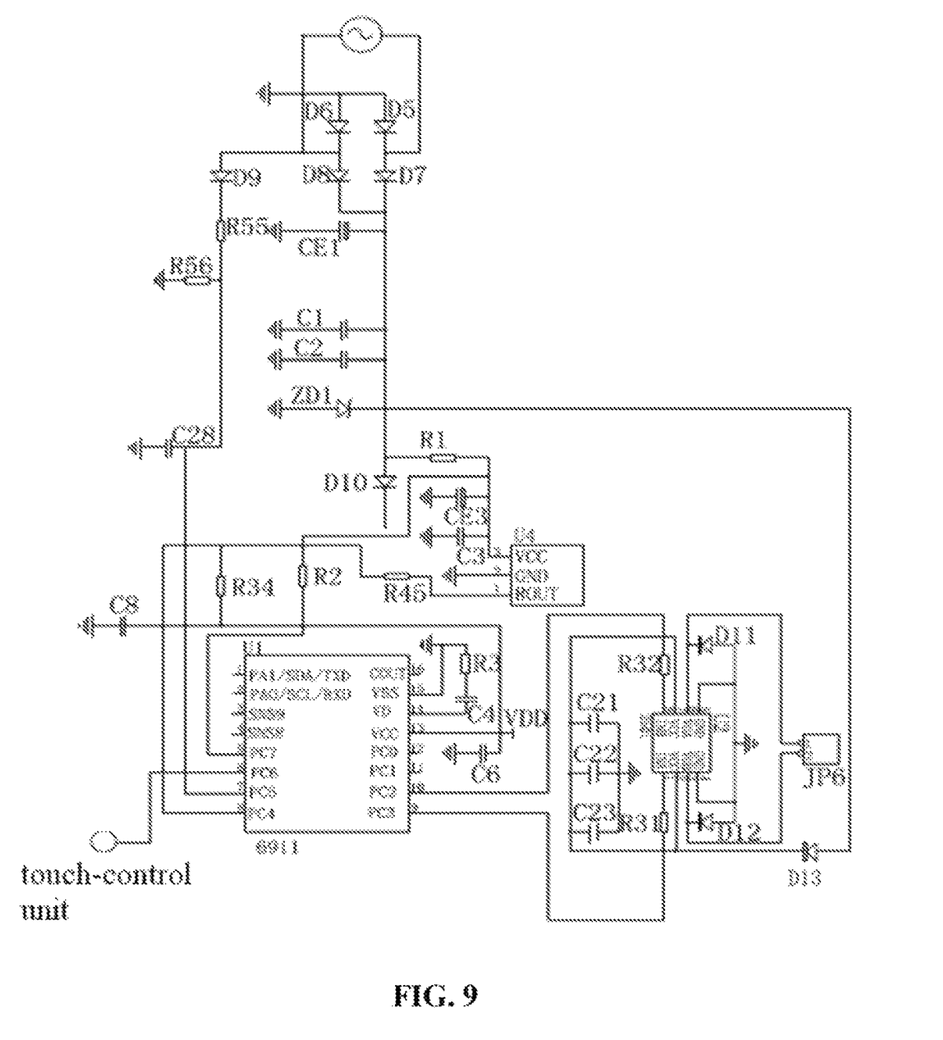
FIG. 9 is a circuit diagram of one specific example of the remote control signal receiver according to the present disclosure.

Referring to FIGS. 7 to 9, there is provided a remote control signal transmitter and a remote control device comprising the remote control signal transmitter and a remote control signal receiver; wherein the remote control signal transmitter 81 comprises any of the above described pressed generators 812.

The remote control signal transmitter 81 further comprises an AC/DC conversion unit 810 and a remote control signal emitting unit 811. The AC/DC conversion unit 810 is connected to the pressed generator 812 for converting the AC power output from the pressed generator 812 into a DC power and providing the DC power for the remote control signal emitting unit 811. The remote control signal emitting unit 811 receives the DC power provided from the AC/DC conversion unit 810, and transmits a remote control signal upon receiving an instruction of remote control signal transmission.

Optionally, the remote control signal transmitter 81 can be provided with an emitting button for user's operation to indicate the remote control signal emitting unit 811 transmitting the remote control signal. Furthermore, optionally, the emitting button can be the same button as the button 3 of the pressed generator 812, so that by pressing the button 3, the transmission of the remote control signal can be achieved concurrently with the pressing for power generation.

FIG. 8 has shown a circuit diagram of one specific example of the remote control signal transmitter 81, wherein the AC power supply represents the pressed generator 812. However, one skilled in the art will understand that, the present disclosure is not limited thereto; the remote control signal transmitter 81 may be of any suitable circuit.

As shown in FIG. 8, the AC/DC conversion unit 810 comprises a first bridge circuit, a capacitor C5, and a polar capacitor CE2. The first bridge circuit comprises diodes D1, D2, D3 and D4, wherein the diodes D1 and D2 are connected in series, the diodes D3 and D4 are connected in series, the cathodes of the diodes D2 and D4 are connected to form a first output of the first bridge circuit, and the anodes of the diodes D1 and D3 are connected to form a second output of the first bridge circuit. A first output of the pressed generator 812 is connected between the diodes D1 and D2, and a second output of the pressed generator 812 is connected between the diodes D3 and D4.

The first output of the first bridge circuit is divided into two paths: one is connected to the 1st pin of a chip U3, the anode of an infrared emitting diode LED and one end of a capacitor C7; while the other is connected to one end of the capacitor C5 and the anode of the polar capacitor CE2. The second output of the first bridge circuit is grounded. The other end of the capacitor C5 is grounded; and the cathode of the polar capacitor CE2 is grounded.

The remote control signal emitting unit 811 may comprise the infrared emitting diode LED, the capacitor C7, a resistor R4, and the chip U3. The 1st pin of the chip U3, the anode of the infrared emitting diode LED and one end of the capacitor C7 are all connected to the first output of the first bridge circuit. The other end of the capacitor C7 is grounded. After being connected in series with the resistor R4, the cathode of the infrared emitting diode LED connects to the 7th pin of the chip U3. The 3rd pin is connected to the 4th pin of the chip. The 8th pin of the chip is grounded. For example, the model of the chip U3 is HS95104S1C.

In the circuit described above, the AC power output from the pressed generator 812 supplies power to the chip U3 and the infrared emitting diode LED after the AC/DC conversion; and in the chip U3, the 3rd pin is connected to the 4th pin, so while the button 3 of the pressed generator 812 is pressed for power generation, the chip U3 transmits signal to the infrared emitter, and simultaneously the infrared emitter is excited to emit infrared signal to the remote control signal receiver 80.

As shown in FIG. 7, the remote control signal receiver 80 comprises a remote control signal receiving unit 800, a signal processing unit 801, an electromagnetic valve switching unit 802 and a power supply unit 803. The power supply unit 803 supplies power to the remote control signal receiving unit 800, the signal processing unit 801 and the electromagnetic valve switching unit 802. The remote control signal receiving unit 800 is configured to receive signal emitted from the remote control signal emitting unit 811 and to transfer the signal into the signal processing unit 801. The signal processing unit 801 is in electrical connection with the electromagnetic valve switching unit 802, and is configured to convert the signal received by the remote control signal receiving unit 800 into signal for controlling the electromagnetic valve switching unit 802. The electromagnetic valve switching unit 802 is configured to control the switching of an electromagnetic valve in the electromagnetic valve switching unit 802 after receiving instructions from the signal processing unit 801.

FIG. 9 has shown a circuit diagram of one specific example of the remote control signal receiver 80. However, one skilled in the art will understand that, the present disclosure is not limited thereto; the remote control signal receiver 80 may be of any suitable circuit.

As shown in FIG. 9, the remote control signal receiving unit 800 comprises an infrared signal receiver U4, capacitors C3 and C8, a polar capacitor CE3, resistors R1, R2, R34 and R45. The signal output pin 1 of the infrared signal receiver U4 is connected in series to the resistor 45 and then divided into two paths: one is connected to the signal processing unit 801, and the other is grounded after being connected in series firstly to the resistor R34 and then to the capacitor C8. The ground pin 2 of the infrared signal receiver U4 is grounded. The power input pin 3 of the infrared signal receiver U4 is connected in series to the resistor R2 and then connected to the signal processing unit 801. One end of the capacitor C3 is connected to the power input pin 3 of the infrared signal receiver U4, and the other end is grounded. One end of the polar capacitor CE3 is connected to the power input pin 3 of the infrared signal receiver U4, and the other end is grounded. One end of the resistor R1 is connected to the power input pin 3 of the infrared signal receiver U4 while the other end is connected to the power supply unit 803.

The electromagnetic valve switching unit 802 comprises an electromagnetic valve JP6, a chip U2, resistors R31 and R32, capacitors C21, C22 and C23, diodes D11, D12 and D13. The 1st pin of the chip U2 is connected in series to the resistor R31 and then connected to the signal processing unit 801. The 8th pin of the chip U2 is connected in series to the resistor R32 and connected to the signal processing unit 801. The 2nd and the 7th pins of the chip U2 are both connected to the cathode of the diode D13, and the anode of the diode D13 is connected to the power supply unit 803. The capacitors C21, C22 and C23 are connected in parallel, and then one end thereof is grounded, and the other end is connected to the 2nd and the 7th pins of the chip U2. The 3rd pin of the chip U2 is connected to the 2nd pin of the electromagnetic valve JP6. The 6th pin of the chip U2 is connected to the 1st pin of the electromagnetic valve JP6. The 4th and the 5th pins of the chip U2 are grounded. The anode of the diode D12 is connected to the 4th pin of the chip U2, and the cathode of the diode D12 is connected to the 3rd pin of the chip U2. The anode of the diode D11 is connected to the 5th pin of the chip U2, and the cathode of the diode D11 is connected to the 6th pin of the chip U2. The model of the chip U2 is, e.g., 2501.

The signal processing unit 801 comprises a chip U1, capacitors C4, C6 and C28 and a resistor R3. The 5th pin of the chip U1 is connected to the resistor R2; the 6th pin of the chip U1 is connected to a touch-control unit; the 7th pin is connected in series to the capacitor C28 and then grounded; the 8th pin is connected to the resistor R45; the 9th pin is connected to the resistor R31; the 10th pin is connected to the resistor R32; the 13th pin is connected to the power supply unit 803; the 14th pin is connected in series firstly to the capacitor C4 and then to the resistor R3 and finally grounded; and the 15th pin is grounded. One end of the capacitor C6 is connected to the power supply unit 803, while the other end is grounded. The chip U1 for example is 6911.

In one alternative implementation, the touch-control unit is electrically connected to a conductive layer (not shown). When a user touches that conductive layer by hand or other conductors, the static electricity of the human body is transferred to the touch-control unit through the conductive layer, and the touch-control unit outputs a preset signal to the 6th pin of the chip U1.

The power supply unit 803 comprises a second bridge circuit, capacitors C1 and C2, a polar capacitor CE1, diodes D9 and D10, resistors R55 and R56 and a voltage regulator diode ZD1. The AC input of the second bridge circuit is connected to an AC power supply, a first output is grounded, and a second output is connected in series to the diode D10 and then connected to the 13th pin of the chip U1. Optionally, the AC power supply may be a hydroelectric power generator.

The second bridge circuit comprises diodes D5, D6, D7 and D8. The diodes D5 and D7 are connected in series, the diodes D6 and D8 are connected in series. The anodes of the diodes D5 and D6 are connected to form a first output of the second bridge circuit, and the cathodes of the diodes D7 and D8 are connected to form a second output of the second bridge circuit. The anode of the diode D9 is connected between the diodes D6 and D8, and the anode of the polar capacitor CE1 is connected between the diodes D7 and D8.

The other end of the resistor R1 is connected to the anode of the diode D10. The polar capacitor CE1 and the capacitors C1 and C2 are connected in parallel, and then one end thereof is connected to the second output of the second bridge circuit and the other end is grounded. The anode of the voltage regulator diode ZD1 is grounded, and the cathode is connected firstly to the second output of the second bridge circuit and then to the anode of the diode D13. The anode of the diode D9 is connected to the AC input of the second bridge circuit, the cathode of the diode D9 is connected in series to the resistor R55 and the resistor R56 sequentially and then grounded. One end of the capacitor C28 is connected between the resistor R55 and the resistor R56.

In the above mentioned circuit, the power supply unit 803 supplies power to the electromagnetic valve switching unit 802, the signal processing unit 801, and the remote control signal receiving unit 800; the infrared signal receiver U4 in the remote control signal receiving unit 800 receives infrared signal emitted from the infrared signal emitting diode, and transmits the signal to the 8th pin of the chip U1 of the signal processing unit 801; the signal is sent to the electromagnetic valve switching unit 802 after being processed and analyzed by the chip U1; after receiving the signal from the chip U1 at the 1st pin or/and the 8th pin, the chip U2 in the electromagnetic valve switching unit 802 converts the signal and controls the real-time state of the electromagnetic valve JP6. Moreover, when the touch-control unit detects a user touching the conductive layer, similarly, the signal processing unit 801 inputs signal to the electromagnetic valve switching unit 802, and the electromagnetic valve switching unit 802 controls the real-time state of the electromagnetic valve JP6 accordingly.

The original infrared signal received by the remote control signal receiver 80 is a full band signal. Alternatively, in the present technique, it can be arranged that, with the control and processing by the chip U1, the remote control signal receiver 80 receives only the infrared signal emitted by the infrared emitting diode LED at the moment that the pressed generator 812 is pressed, wherein that infrared signal is a part of the full band of infrared signal, and the time (duration) is less than 1 millisecond. Thus, the purpose of emitting a remote control signal at the same time with the power generation by pressing, and using the remote control signal for controlling the electromagnetic valve can be achieved, being more convenient and energy-efficiency.

Embodiment 5

Figure 10:
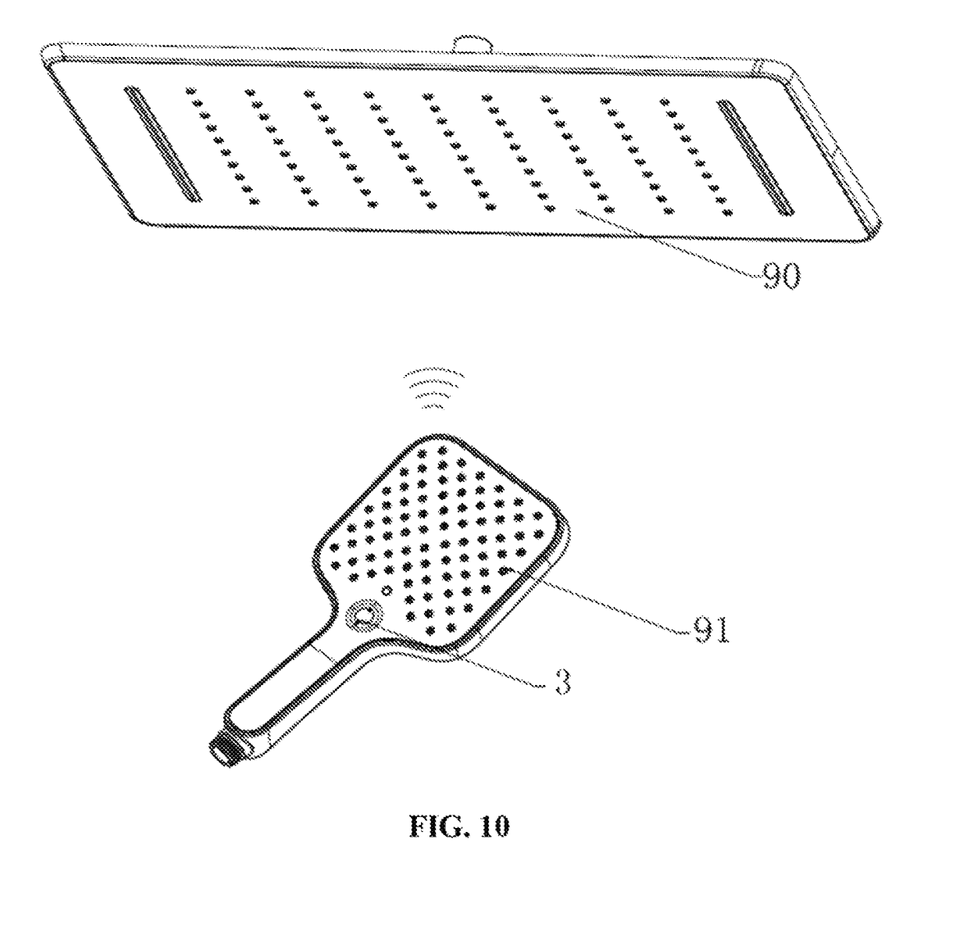
FIG. 10 is a structural diagram of an example shower according to the present disclosure.

Referring to FIG. 10, there is provided a shower comprising an overhead showerhead 90 and a hand-held showerhead 91. The remote control device according to embodiment 4 is mounted in the shower. The remote control signal receiver 80 is mounted in the overhead showerhead 90; wherein the electromagnetic valve JP6 of the electromagnetic valve switching unit 802 is mounted in the outlet path of water in the overhead showerhead 90, and may turn on or off the outlet path of water. The remote control signal transmitter 81 is mounted in the hand-held showerhead 91. As shown in FIG. 10, button 3, which also functions as the emitting button for the remote control signal transmitter 81, is arranged in an upper part of the handle of the hand-held showerhead 91.

Optionally, the overhead showerhead 90 may further comprise the above mentioned touch-control unit (not shown), wherein the touch-control unit is configured to be in electrical connection with the electroplating layer over the surface of the overhead showerhead 90.

When the user wishes to switch the outlet state of the overhead showerhead 90, he/she may press the button 3 on the hand-held showerhead 91. Meanwhile, since the electroplating layer over the overhead showerhead 90 is electrically connected to the touch-control unit, it is also possible to switch the outlet state by touching the electroplating layer over the overhead showerhead 90.

Optionally, the AC power supply of the remote control signal receiver 80 may be a hydroelectric power generator. In such a case, the entire shower is a battery-free shower, making the shower more suitable for the harsh environment of bathroom, increasing the lifetime of the shower, and being energy saving and environmental friendly.

The foregoing description shows and describes some embodiments of the present disclosure. As described above, it should be understood that the present disclosure does not limit to the forms disclosed herein and should not be construed as excluding other embodiments, but can be used in various other combinations, modifications and environments; and modifications can be applied within the scope of the technique described herein from the above teachings or techniques or knowledge in the field. Variations and modifications made by those skilled in the art do not depart from the spirit and scope of the present disclosure, but are intended to be included within the protection scope of the present disclosure as set forth in the appended claims.

What is claimed is:

1. A pressed generator comprising: a generator body comprising a coil, a magnetic conducting rod and permanent magnets; wherein the magnetic conducting rod passes through the coil; the permanent magnets include two sets of permanent magnets which are separately provided at both ends of the magnetic conducting rod, and
a driving unit connected to the generator body and comprising a button and a transmission part, wherein the transmission part comprises swing arms and permanent magnet mounting frames, wherein the permanent magnet mounting frames include two permanent magnet mounting frames which are connected via the swing arms; the permanent magnets are fixed in the permanent magnet mounting frames; and the swing arms swing around a rotating shaft positioned in the middle of the swing arms by pressing the button, to drive the two sets of permanent magnets to move up and down alternately, so that the polarities of the magnetic conducting rod change instantaneously, to cut magnetic induction lines by the coil for power generation.

2. The pressed generator according to claim 1, wherein the generator body further comprises a fixing frame; the coil being fixedly arranged in the fixing frame; each set of permanent magnets comprising an upper magnetic piece and a lower magnetic piece that are provided in parallel with each other; and the magnetic conducting rod extending between the upper magnet pieces and the lower magnet pieces, and
the button being positioned at one end of one of the permanent magnet mounting frames, shaft holes being provided in the middle of the swing arms, and protruding shafts being provided on both sides of the fixing frame, the protruding shafts being inserted into the shaft holes to form rotating shafts.

3. The pressed generator according to claim 2, wherein the pressed generator further comprises a housing, wherein the generator body and the driving unit are accommodated in the housing after being assembled, the coil and the magnetic conducting rod are fixed inside the housing by the fixing frame, a spring is provided beneath the one of the permanent magnet mounting frames, the button is pressed by the spring via the one of the permanent magnet mounting frames.

4. A pressed generator comprising:
a generator body comprising a coil and a magnetic component installed within the coil, and
a driving unit connected to the generator body,
wherein the driving unit comprises a button and a transmission part, the transmission part comprising a movement converting mechanism through which straight movements of pressing the button drives the magnetic component to rotate within the coil to cut magnetic induction lines by the coil for power generation.

5. The pressed generator according to claim 4, wherein the transmission part comprises a spring urging the button and a mono-directional clutch, and the pressed generator is configured to generate power at least when the button is bounced up by the spring.

6. A pressed generator comprising: a generator-body comprising a coil winding frame, a coil, a rotating shaft and a magnetic ring; wherein the coil is mounted on the coil winding frame; the magnetic ring is arranged at one end of and inside the coil, and is provided coaxially with the coil; the rotating shaft passes through the coil and the magnetic ring at the center, and the magnetic ring is connected to the rotating shaft fixedly so that the magnetic ring is capable of rotating with the rotating shaft inside the coil, and a driving unit connected to the generator body and comprising a button and a transmission part, wherein the transmission part comprises a button base, a spring, a rack, an external gear, an external gear frame, a ratchet wheel and pawls; wherein the button is arranged in the button base; the spring is arranged between the button base and the button; the rack extends from the bottom of the button toward the button base, and the teeth of the rack are configured to engage with the teeth of the external gear;

the external gear is fixed at the middle of the external gear frame, the pawls are connected on the opposite edges of the external gear frame in a movable manner, the pawls and the external gear frame are mounted into the ratchet wheel together, and the pawls are configured to engage with the internal teeth of the ratchet wheel; the ratchet wheel is located at the other end of the coil; the rotating shaft passes through the ratchet wheel at the center, and the rotating shaft is fixedly connected to the ratchet wheel, wherein the rack moves downward with the button when the button is pressed down and moves upward with the button under action of the spring when the button is released, and drives the external gear to rotate which then drives the external gear frame to rotate, and wherein when the external gear frame rotates in one direction the pawls will slip inside the ratchet wheel, and when the external gear frame rotates in the other direction the pawls will be stuck inside the ratchet wheel, and the rotating shaft rotates with the ratchet wheel, thereby driving the magnetic ring to rotate in the coil, to cut magnetic induction lines by the coil for power generation.

7. The pressed generator according to claim 6, wherein the pressed generator further comprises a base, a coil bottom cap and a ball; wherein the coil bottom cap is arranged to cover one end of the coil; the ball is arranged between the coil bottom cap and an end of the rotating shaft; and the generator body and the transmission part are accommodated in the base after being assembled.

8. A pressed generator comprising:
a generator body comprising a coil and a magnetic component installed within the coil, and
a driving unit connected to the generator body;
wherein the driving unit comprises a button and a transmission part, the transmission part comprising a threaded transmission assembly and a spring, the threaded transmission assembly includes a first threaded component extending downward from the button, the spring urges the button upward; the button is configured to drive the magnetic component to rotate with respect to the coil at least when the button is bounced up by the spring, to cut magnetic induction lines by the coil for power generation.

9. A pressed generator comprising:
a generator body comprising a coil, a coil winding frame, a magnetic ring and a magnetic ring inner frame; wherein the coil winding frame comprises outer frames and an inner frame, and the outer frames are provided on both sides of an outer wall of the inner frame and connected to the inner frame; the coil is fixedly arranged between the outer frames and the inner frame; the magnetic ring is sheathed fixedly over the magnetic ring inner frame and accommodated in the inner frame of the coil winding frame together with the magnetic ring inner frame; the top of the magnetic ring inner frame penetrates out of the top of the inner frame of the coil winding frame, and a driving unit connected to the generator body and comprising a button and a transmission part, wherein the transmission part comprises a threaded transmission assembly and a spring; wherein the threaded transmission assembly comprises an externally threaded rod extending downward from the bottom of the button and an internally threaded wall arranged on the inner wall of the inner frame of the coil winding frame, the central part of the externally threaded rod has a hollow structure, and the top of the magnetic ring inner frame is capable of being inserted into the hollow structure and connected to the externally threaded rod in a non-relatively-rotatable manner, wherein the externally threaded rod moves downward along the internally threaded wall and meanwhile rotates when the button is pressed down, driving the magnetic ring inner frame to rotate with it and further driving the magnetic ring to rotates in the coil, and the externally threaded rod moves upward along the internally threaded wall and meanwhile rotates in an opposite direction when the button is released and restored to previous position under action of the spring, driving the magnetic ring inner frame to rotate in an opposite direction and further driving the magnetic ring to rotate in the coil, to cut magnetic induction lines by the coil for power generation.

10. The pressed generator according to claim 9, wherein the generator body further comprises a rotating shaft and a coil bottom cap, wherein one end of the rotating shaft is inserted into the bottom of the magnetic ring inner frame, the other end of the rotating shaft is connected to the coil bottom cap in a rotatable manner, and the pressed generator further comprises a ball and a base; wherein the ball is arranged between the rotating shaft and the coil bottom cap; and the generator body and the transmission part are accommodated in the base after being assembled.

11. A remote control signal transmitter comprising the pressed generator according to claim 1.

12. The remote control signal transmitter according to claim 11, wherein the remote control signal transmitter is configured to transmit a remote control signal when the button is pressed.

13. The remote control signal transmitter according to claim 12, wherein the remote control signal transmitter further comprises an AC/DC conversion unit and a remote control signal emitting unit, the AC/DC conversion unit is connected to the pressed generator, and configured to convert the AC power output from the pressed generator into DC power and provide the DC power for the remote control signal emitting unit, and the remote control signal emitting unit is configured to transmit the remote control signal when the button is pressed.

14. A remote control device, comprising the remote control signal transmitter according to claim 11 and a remote control signal receiver.

15. The remote control device according to claim 14, wherein the remote control signal receiver comprises a remote control signal receiving unit, a signal processing unit, an electromagnetic valve switching unit and a power supply unit, the power supply unit is configured to supply power to the remote control signal receiving unit, the signal processing unit and the electromagnetic valve switching unit, the remote control signal receiving unit is configured to receive the remote control signal emitted from the remote control signal transmitter and to transfer the signal into the signal processing unit, the signal processing unit is in electrical connection with the electromagnetic valve switching unit, and is configured to convert the signal received by the remote control signal receiving unit into a signal for controlling the electromagnetic valve switching unit, and the electromagnetic valve switching unit is configured to control the switching of an electromagnetic valve in the electromagnetic valve switching unit after receiving an instruction from the signal processing unit.

16. A shower comprising:
an overhead showerhead; and
a hand-held showerhead,
wherein the shower is provided with the remote control device according to claim 14,
the remote control signal receiver is mounted in the overhead showerhead, and
the remote control signal transmitter is mounted in the hand-held showerhead.

17. A shower comprising:
an overhead showerhead; and
a hand-held showerhead,
wherein the shower is provided with the remote control device according to claim 15,
the remote control signal receiver is mounted in the overhead showerhead,
the remote control signal transmitter is mounted in the hand-held showerhead, and
the electromagnetic valve in the electromagnetic valve switching unit is mounted in the outlet path of water in the overhead showerhead, and is operable to turn on or off the outlet path of water.

18. The shower according to claim 17, wherein the power supply unit comprises a hydroelectric power generator.

19. The shower according to claim 18, wherein the overhead showerhead further comprises a touch-control unit, which is in electrical connection with a electroplating layer over the surface of the overhead showerhead and the signal processing unit respectively, and is configured to transmit a signal to the signal processing unit for controlling the electromagnetic valve switching unit when the electroplating layer is touched by an user.

* * * * *